US012624264B2

(12) United States Patent
Fan et al.

(10) Patent No.: US 12,624,264 B2
(45) Date of Patent: May 12, 2026

(54) SOLVENTLESS PRESSURE SENSITIVE ADHESIVE COMPOSITION

(71) Applicant: Dow Silicones Corporation, Midland, MI (US)

(72) Inventors: Rongrong Fan, Shanghai (CN); Zhihua Liu, Shanghai (CN); Qing Cao, Shanghai (CN); Xiaocong Xu, Shanghai (CN); Jiayin Zhu, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 421 days.

(21) Appl. No.: 18/249,979

(22) PCT Filed: Feb. 9, 2021

(86) PCT No.: PCT/CN2021/076335
§ 371 (c)(1),
(2) Date: Apr. 21, 2023

(87) PCT Pub. No.: WO2022/170507
PCT Pub. Date: Aug. 18, 2022

(65) Prior Publication Data
US 2023/0392061 A1 Dec. 7, 2023

(51) Int. Cl.
*C09J 183/04* (2006.01)
*C09J 7/38* (2018.01)
*C08G 77/12* (2006.01)
*C08G 77/20* (2006.01)

(52) U.S. Cl.
CPC .............. *C09J 183/04* (2013.01); *C09J 7/38* (2018.01); *C08G 77/12* (2013.01); *C08G 77/20* (2013.01); *C09J 2203/318* (2013.01); *C09J 2483/00* (2013.01)

(58) Field of Classification Search
CPC ................................. C09J 183/04; C09J 7/38
See application file for complete search history.

(56) References Cited

U.S. PATENT DOCUMENTS

| | | | |
|---|---|---|---|
| 2,676,182 A | 4/1954 | Daudt et al. | |
| 3,159,601 A | 12/1964 | Ashby et al. | |
| 3,220,972 A | 11/1965 | Lamoreaux et al. | |
| 3,296,291 A | 1/1967 | Scotia et al. | |
| 3,419,593 A | 12/1968 | Willing et al. | |
| 3,445,420 A | 5/1969 | Kookootsedes et al. | |
| 3,516,946 A | 6/1970 | Scotia et al. | |
| 3,691,206 A | 9/1972 | Northrup | |
| 3,814,730 A | 6/1974 | Karstedt et al. | |
| 3,989,667 A | 11/1976 | Lee et al. | |
| 3,989,668 A | 11/1976 | Lee et al. | |
| 4,374,967 A | 2/1983 | Brown et al. | |
| 4,584,355 A | 4/1986 | Blizzard et al. | |
| 4,585,836 A | 4/1986 | Homan et al. | |
| 4,591,622 A | 5/1986 | Blizzard et al. | |
| 4,611,042 A | 9/1986 | Rivers-Farrell et al. | |

| | | | |
|---|---|---|---|
| 4,766,176 A | 8/1988 | Lee et al. | |
| 4,774,310 A | 9/1988 | Butler | |
| 4,784,879 A | 11/1988 | Lee et al. | |
| 5,017,654 A | 5/1991 | Togashi et al. | |
| 5,036,117 A | 7/1991 | Chung et al. | |
| 5,175,325 A | 12/1992 | Brown et al. | |
| 5,270,110 A | 12/1993 | Murakami et al. | |
| 5,292,586 A | 3/1994 | Lin et al. | |
| 5,357,007 A * | 10/1994 | Wengrovius ............... C09J 7/38 528/502 E |
| 5,360,833 A | 11/1994 | Eckberg et al. | |
| 5,369,205 A | 11/1994 | Eckberg et al. | |
| 5,466,532 A | 11/1995 | Wengrovius et al. | |
| 5,468,816 A | 11/1995 | Hurford et al. | |
| 5,468,828 A | 11/1995 | Hurford et al. | |
| 5,494,797 A | 2/1996 | McCann et al. | |
| 5,567,764 A | 10/1996 | Brasseur et al. | |
| 5,708,098 A | 1/1998 | Cook et al. | |
| 5,783,311 A | 7/1998 | Lorenzetti et al. | |
| 5,844,031 A | 12/1998 | Chen et al. | |
| 5,861,450 A | 1/1999 | Chen et al. | |
| 6,020,412 A | 2/2000 | Muschelewicz et al. | |
| 6,121,368 A | 9/2000 | Heying et al. | |
| 6,353,075 B1 | 3/2002 | Hupfield et al. | |
| 6,387,487 B1 * | 5/2002 | Greenberg ............. C09J 183/04 428/355 R |

(Continued)

FOREIGN PATENT DOCUMENTS

| | | | |
|---|---|---|---|
| CN | 102174309 | 9/2011 | |
| CN | 105102576 | 11/2015 | |
| EP | 0216376 | 4/1987 | |
| EP | 0556023 | 8/1993 | |
| EP | 0347895 | 11/1993 | |
| EP | 3757186 | 12/2020 | |
| JP | 2004-231900 | * 8/2004 | |
| JP | 2008274251 | 11/2008 | |
| WO | 2012094775 | 7/2012 | |
| WO | 2012094885 | 7/2012 | |
| WO | 2013123619 | 8/2013 | |
| WO | 2019043491 | 3/2019 | |

(Continued)

OTHER PUBLICATIONS

Machine translation of JP 2004-231900 (no date).*

*Primary Examiner* — Marc S Zimmer

(74) *Attorney, Agent, or Firm* — Catherine U. Brown

(57) ABSTRACT

A process for preparing a solventless pressure sensitive adhesive composition comprising mixing (A) a solid polyorganosilicate resin component with (B) an aliphatically unsaturated polydiorganosiloxane (B-1), a branched polyorganosiloxane (B-2), or a mixture of (B-1) and (B-2), at certain temperatures, followed by cooling. The solventless pressure sensitive adhesive composition prepared by the process has a low viscosity and can be cured to form pressure sensitive adhesives. The pressure sensitive adhesives are suitable for protective film applications.

14 Claims, No Drawings

(56) References Cited

U.S. PATENT DOCUMENTS

| | | | |
|---|---|---|---|
| 6,677,407 | B1 | 1/2004 | Bilgrien et al. |
| 6,806,339 | B2 | 10/2004 | Cray et al. |
| 7,005,475 | B2 | 2/2006 | Griswold |
| 7,687,591 | B2 * | 3/2010 | Bhagwagar ............. C08L 83/00 |
| | | | 528/25 |
| 7,728,080 | B2 | 6/2010 | Aoki et al. |
| 8,017,712 | B2 | 9/2011 | Berry et al. |
| 8,058,190 | B2 | 11/2011 | Sweet et al. |
| 8,093,339 | B2 | 1/2012 | White et al. |
| 8,580,073 | B2 | 11/2013 | Behl et al. |
| 9,562,149 | B2 | 2/2017 | Cray et al. |
| 9,593,209 | B2 | 3/2017 | Dent et al. |
| 9,777,203 | B2 | 10/2017 | Newsham et al. |
| 10,351,742 | B2 | 7/2019 | Brown et al. |
| 10,479,913 | B2 | 11/2019 | Han et al. |
| 10,513,629 | B2 | 12/2019 | Huang |
| 10,774,217 | B2 | 9/2020 | Bekemeier et al. |
| 2003/0088042 | A1 | 5/2003 | Griswold et al. |
| 2004/0254274 | A1 | 12/2004 | Griswold |
| 2005/0038188 | A1 | 2/2005 | Ahn et al. |
| 2006/0189767 | A1 | 8/2006 | Bhagwagar et al. |
| 2007/0289495 | A1 | 12/2007 | Cray et al. |
| 2011/0111217 | A1 | 5/2011 | Kuroda et al. |
| 2012/0045634 | A1 | 2/2012 | Irie et al. |
| 2012/0045635 | A1 * | 2/2012 | Aoki ....................... C08L 83/00 |
| | | | 525/100 |
| 2012/0328863 | A1 | 12/2012 | Kuo |
| 2015/0119518 | A1 | 4/2015 | Yamamoto et al. |
| 2016/0053056 | A1 | 2/2016 | Gould et al. |
| 2016/0053148 | A1 * | 2/2016 | Tsuchida .................. C08K 5/56 |
| | | | 524/588 |
| 2016/0376475 | A1 | 12/2016 | Huang et al. |
| 2016/0376482 | A1 | 12/2016 | Morgeneyer et al. |
| 2017/0233612 | A1 | 8/2017 | Han et al. |
| 2018/0105692 | A1 | 4/2018 | Imaizumi et al. |
| 2020/0071578 | A1 | 3/2020 | Huo et al. |
| 2022/0177755 | A1 * | 6/2022 | Jiang ....................... C09J 183/04 |

FOREIGN PATENT DOCUMENTS

| | | |
|---|---|---|
| WO | 2019049365 | 3/2019 |
| WO | 2019079366 | 4/2019 |
| WO | 2020000389 | 1/2020 |
| WO | WO 2021/081822 A1 * | 5/2021 |

* cited by examiner

SOLVENTLESS PRESSURE SENSITIVE ADHESIVE COMPOSITION

CROSS REFERENCE TO RELATED APPLICATIONS

This application is a U.S. national stage filing under 35 U.S.C. § 371 of PCT Application No. PCT/CN2021/076335 filed on 9 Feb. 2021. PCT Application No. PCT/CN2021/076335 is hereby incorporated by reference.

FIELD OF THE INVENTION

The present invention is a solventless pressure sensitive adhesive composition and a process for preparing the pressure sensitive adhesive composition.

INTRODUCTION

A polyorganosilicate resin is solid at room temperature. Without solvent, the polyorganosilicate resin typically has a powder or flake form, which makes it difficult to blend with other ingredients homogeneously when preparing silicone pressure sensitive adhesive (PSA) compositions. Attempts to manufacture solventless PSA compositions typically include dissolving the polyorganosilicate resin in a solvent or combining the polyorganosilicate resin and other silicone components in a solvent and thereafter removing the solvent. The step of solvent removal (e.g., stripping) results in increased manufacturing and equipment cost and the resulting composition inherently typically contains residual solvent in an amount of more than 1,000 part per million (ppm). Moreover, relatively low viscosity is desirable for certain applications such as for protective films, e.g., a viscosity of less than 5,000 millipascal-seconds (mPa·s) at room temperature. However, commercially available solventless PSA compositions usually have high viscosities which make it difficult to directly coat such solventless PSA compositions onto substrates. In this case, customers still need to dilute the PSA compositions using solvents after receipt and before use.

It is desirable to discover a process for preparing a solventless PSA composition suitable for use in protective films for electronics applications without the aforementioned problems.

SUMMARY OF THE INVENTION

The present invention solves the problem of discovering a solventless pressure sensitive adhesive (PSA) composition without the aforementioned problems.

The present invention provides a novel process for preparing the solventless PSA composition comprising preparation of a silicone base part with a viscosity of less than 5,000 millipascal-seconds (mPa·s) at room temperature. The resulting solventless PSA composition of the present invention can be directly applied to a substrate and cured to form pressure sensitive adhesives (PSAs). The PSAs can provide desired coating appearance and adhesion strength particularly suitable for protective film applications, for example, peel adhesion of 20 grams per inch (g/in) or less. Viscosity and adhesion properties can be measured according to the test methods described in the Examples section below.

In a first aspect, the present invention provides a process for preparing a solventless pressure sensitive adhesive composition. The process comprises:

(i) providing starting material (A) a solid polyorganosilicate component comprising:

(A-1) more than 30% to 100% by weight, based on the weight of starting material (A), of a solid capped resin of unit formula (I-1):

$$(R^M{}_3SiO_{1/2})_a(SiO_{4/2})_bZ_c$$

where each $R^M$ is independently a monovalent hydrocarbon group of from 1 to 20 carbon atoms; each Z is independently a hydrolyzable group selected from the group consisting of alkoxy, hydroxyl, or mixtures thereof; c is from 0 to a value sufficient to give the capped resin a hydrolyzable group content up to 2%, by weight based on the weight of the capped resin; and a and b have values such that a>4, b>0, and the value of (a+b) is sufficient to give the capped resin a number average molecular weight of from 500 to 8,000 g/mol; and (A-2) zero to less than 70% by weight, based on the weight of starting material (A), of a solid uncapped resin of unit formula of (I-2):

$$(R^M{}_3SiO_{1/2})_{a'}(SiO_{4/2})_{b'}Z_{c'},$$

where $R^M$ and Z are as described above; a' and b' have values such that a'>4, b'>0, and the value of (a'+b') is sufficient to give the uncapped resin a number average molecular weight of from 500 to 8,000 g/mol; and c' has a value sufficient to give the uncapped resin a hydrolyzable group content of >2% to 10% by weight based on the weight of the uncapped resin;

(ii) mixing starting material (A) with starting material (B) and optionally starting material (C) at a temperature of 100° C. or higher;

wherein starting material (B) is an aliphatically unsaturated polydiorganosiloxane (B-1), a branched polyorganosiloxane (B-2), or a mixture of (B-1) and (B-2), wherein the aliphatically unsaturated polydiorganosiloxane (B-1) comprises unit formula (II-1):

$$(R^1{}_2R^2SiO_{1/2})_x(R^1{}_3SiO_{1/2})_y(R^1R^2SiO_{2/2})_z(R^1{}_2SiO_{2/2})_w$$

where each $R^1$ is independently a monovalent hydrocarbon group of from 1 to 20 carbon atoms that is free of aliphatic unsaturation; each $R^2$ is independently a monovalent aliphatically unsaturated hydrocarbon group of from 2 to 20 carbon atoms; x, y, z, and w have values such that x>0, y≥0, (x+=2, z≥0, w≥0, (w+z)>0, and the value of (x+y+z+w) is sufficient to give the aliphatically unsaturated polydiorganosiloxane a number average molecular weight of from 5,000 to 50,000 g/mol;

wherein the branched polyorganosiloxane (B-2) comprises unit formula (II-2):

$$(R^1{}_3SiO_{1/2})_g(R^1{}_2R^2SiO_{1/2})_h(R^1{}_2SiO_{2/2})_i(SiO_{4/2})$$

where $R^1$ and $R^2$ are as described above, and g, h, and i have values such that 2≥g≥0, 4≥h≥0, 995≥i≥(g+h)=4, and the value of (g+h+i) is sufficient to give the branched polyorganosiloxane a number average molecular weight of from 5,000 to 50,000 g/mol;

wherein starting material (C) is a polydiorganosiloxane gum of unit formula (III):

$$(R^1_2R^GSiO_{1/2})_2(R^1_2SiO_{2/2})_d$$

where $R^1$ is as described above; each $R^G$ is independently a monovalent aliphatically unsaturated hydrocarbon group of from 2 to 20 carbon atoms, hydroxyl, or combinations thereof; and d has a value sufficient to give the polydiorganosiloxane gum a number average molecular weight of 300,000 g/mol or more;

wherein starting materials (A), (B), and (C) are present in amounts to provide a weight ratio of the amount of starting material (A) to combined amounts of starting materials (B) and (C) if present of from 0.1 to 1.2;

(iii) cooling the mixture obtained from step (ii) to form a silicone base part with a viscosity of less than 5,000 mPa·s at room temperature; and (iv) admixing the silicone base part obtained from step (iii) with starting material (D) a polyorganohydrogensiloxane, starting material (E) a hydrosilylation reaction catalyst, optionally starting material (F) a hydrosilylation reaction inhibitor, and optionally starting material (G) an anchorage additive; thus forming the solventless pressure sensitive adhesive composition.

In a second aspect, the present invention provides a solventless pressure sensitive adhesive composition prepared by the process of the first aspect.

In a third aspect, the present invention provides a method of making an adhesive article comprising:

optionally (1) treating a surface of a substrate, (2) coating the solventless pressure sensitive adhesive composition of the second aspect on the surface of the substrate, and (3) curing the solventless pressure sensitive adhesive composition.

DETAILED DESCRIPTION OF THE INVENTION

"Solid" means a resin or polymer is solid at room temperature (23±2 degrees Celsius (° C.)).

"Alkyl" herein means a cyclic, branched, or unbranched, saturated monovalent hydrocarbon group. Examples of alkyl groups include methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl.

"Aryl" herein means a cyclic, fully unsaturated, hydrocarbon group. Aryl is exemplified by, but not limited to, cyclopentadienyl, phenyl, anthracenyl, and naphthyl. Monocyclic aryl groups may have from 5 to 9 carbon atoms, from 6 to 7 carbon atoms, or from 5 to 6 carbon atoms. Polycyclic aryl groups may have from 10 to 17 carbon atoms, from 10 to 14 carbon atoms, or from 12 to 14 carbon atoms.

"Aralkyl" herein means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Alkenyl" herein means a branched or unbranched, monovalent hydrocarbon group having one or more carbon-carbon double bonds.

The process for preparing the solventless PSA composition of the present invention comprises (i) providing starting material (A), starting material (B), and optionally starting material (C). Starting material (A) useful in the present invention is a solid polyorganosilicate resin component comprising, based on the weight of starting material (A), more than 30% to 100% by weight of (A-1) a solid capped resin, and zero to less than 70% by weight of (A-2) a solid uncapped resin.

The solid capped resin (A-1) useful in the present invention has unit formula (I-1):

$$(R^M_3SiO_{1/2})_a(SiO_{4/2})_bZ_c$$

where each $R^M$ is independently a monovalent hydrocarbon group of from 1 to 20 carbon atoms; each Z is independently a hydrolyzable group selected from the group consisting of alkoxy, hydroxyl, or mixtures thereof; c is from 0 to a value sufficient to give the capped resin a hydrolyzable group content up to 2% by weight based on the weight of the capped resin; and a and b have values such that a>4, b>0, preferably b>1, and the value of (a+b) is sufficient to give the capped resin a number average molecular weight (Mn) of from 500 to 8,000 grams per mole (g/mol) as measured by gel permeation chromatography (GPC) analysis. GPC analysis may be conducted according to the test method described in the Examples section below.

The hydrocarbon groups for $R^M$ may be selected from the group consisting of alkyl groups, alkenyl groups, aryl groups, aralkyl groups, or mixtures thereof. The alkyl groups represented by $R^M$ typically have from 1 to 20 carbon atoms, from 1 to 15 carbon atoms, from 1 to 12 carbon atoms, from 1 to 10 carbon atoms, from 1 to 6 carbon atoms, from 1 to 3 carbon atoms, or from 1 to 2 carbon atoms. Examples of suitable alkyl groups include methyl, ethyl, propyl, pentyl, hexyl, and cyclohexyl. The alkenyl groups represented by $R^M$ typically have from 2 to 20 carbon atoms, from 2 to 10 carbon atoms, from 2 to 8 carbon atoms, or from 2 to 6 carbon atoms. Examples of suitable alkenyl groups represented by $R^M$ include vinyl, allyl, butenyl, and hexenyl. Preferably, the alkyl group is methyl and the alkenyl group is vinyl. Aryl group represented by $R^M$ may include cyclopentadienyl, phenyl, anthracenyl, and naphthyl. Each $R^M$ may be independently selected from methyl, vinyl and phenyl. Preferably, at least one-third or at least two thirds of the $R^M$ groups are alkyl groups (e.g., methyl groups). For example, each $R^M$ is independently an alkyl group of from 1 to 6 carbon atoms, preferably, methyl.

The value of (a+b) in formula (I-1) is sufficient to give the Mn of the capped resin of 500 g/mol or more, 1,000 g/mol or more, 1,500 g/mol or more, 2,000 g/mol or more, 2,500 g/mol or more, or even 2,700 g/mol or more, and at the same time, 8,000 g/mol or less, 7,000 g/mol or less, 6,500 g/mol or less, 6,000 g/mol or less, 5,500 g/mol or less, 5,000 g/mol or less, or even 4,700 g/mol or less, as determined by GPC analysis. For example, the value of a may be from 40 to 55 or from 43 to 50. The value of b may be from 45 to 65 or from 50 to 57.

The value of c in formula (I-1) is from 0 to a value sufficient to give the capped resin a hydrolyzable group content of from zero to up to 2%. The hydrolyzable group is typically hydroxyl. For example, the solid capped resin (A-1) comprises 2% or less of silicon bonded hydroxyl (OH) groups (also referred as "silanol groups"), by weight based on the weight of the capped resin, for example, 1.9% or less, 1.8% or less, 1.7% or less, 1.6% or less, 1.5% or less, 1.4% or less, 1.3% or less, 1.2% or less, 1.1% or less, or even 1% or less of silicon bonded hydroxyl groups. Weight percentage of silicon bonded hydroxyl groups can be determined by nuclear magnetic resonance (NMR) spectroscopy. NMR analysis can be conducted according to the test method described in the Examples section below.

The solid uncapped resin (A-2) useful in the present invention has unit formula of (1-2):

$$(R^M_3SiO_{1/2})_{a'}(SiO_{4/2})_{b'}Z_{c'}$$

where each $R^M$ and $Z$ are as described above in the capped resin (A-1) section; $c'$ has a value sufficient to give the uncapped resin a hydrolyzable group content of >2% to 10% by weight based on the weight of the uncapped resin, and $a'$ and $b'$ have values such that $a'>4$, $b'>0$, preferably, $b'>1$, and the value of $(a'+b')$ is sufficient to give the uncapped resin the Mn of from 500 to 8,000 g/mol as measured by GPC analysis, for example, 1,000 g/mol or more, 1,500 g/mol or more, 2,000 g/mol or more, 2,500 g/mol or more, or even 2,700 g/mol or more, and at the same time, 8,000 g/mol or less, 7,000 g/mol or less, 6,500 g/mol or less, 6,000 g/mol or less, 5,500 g/mol or less, 5,000 g/mol or less, or even 4,700 g/mol or less, as determined by GPC analysis. For example, the value of $a'$ may be from 40 to 55 or from 43 to 50. The value of $b'$ may be from 45 to 65 or from 50 to 57. The solid uncapped resin may comprise silicon bonded OH groups in an amount >2%, >2.5%, or even >3%. Weight percentage of silicon bonded OH groups can be determined by NMR spectroscopy. GPC and NMR analyses may be conducted according to the test methods described in the Examples section below.

The solid polyorganosilicate resin (e.g., (A-1) and (A-2) above) useful in the present invention comprises monofunctional units ("M" units) of formula $R^M_3SiO_{1/2}$ and tetrafunctional silicate units ("Q" units) of formula $SiO_{4/2}$. The M units may be exemplified by $(Me_3SiO_{1/2})$, $(Me_2PhSiO_{1/2})$, or $(Me_2ViSiO_{1/2})$, where Me denotes methyl, Ph denotes phenyl, and Vi denotes vinyl. The polyorganosilicate resin may contain a neopentamer organopolysiloxane having the formula $(R^MSiO)_4Si$, a by-product in the preparation of the resin, such as tetrakis(trimethylsiloxy)silane. The mole ratio of M units to Q units ("M/Q ratio") in the polyorganosilicate resin is typically in the range of from 0.5 to 1.5, from 0.65 to 1.3, or from 0.8 to 1.2, as determined by NMR analysis. The M/Q ratio represents the total number of M units to the total number of Q units in the polyorganosilicate resin and includes contributions from any neopentamer if present. The polyorganosilicate resin may contain $HOSiO_{3/2}$ units (TOH units) and/or $HOR^M_2SiO_{1/2}$, which account for the silicon bonded hydroxyl content of the polyorganosilicate resin.

The solid polyorganosilicate resin (e.g., (A-1) and (A-2) above) useful in the present invention can be prepared by any suitable method, such as cohydrolysis of the corresponding silanes or by silica hydrosol capping methods. The solid polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having monofunctional units and tetrafunctional units. The resulting copolymers generally contain from 2 to 5 percent by weight of hydroxyl groups. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group in a process referred to a capping. Silanes containing hydrolyzable groups may be added in molar excess of the quantity required to react with the silicon bonded hydroxyl groups on the polyorganosilicate resin. The solid polyorganosilicate resin may be prepared and then devolatilized as described, for example in U.S. Pat. No. 8,017,712 to Berry, et al. and the references cited therein and U.S. Pat. No. 10,351,742 to Brown, et al. and the references cited therein. Solid polyorganosilicate resins (e.g., flake resins) are also commercially available from various sources such as Dow Silicones Corporation of Midland, Michigan, USA; Momentive Performance Materials of Albany, New York, USA, and Bluestar Silicones USA Corp. of East Brunswick, New Jersey, USA.

Starting material (A) can be a mixture of two or more solid polyorganosilicate resins that differ in structure, Mn, siloxane units, sequence, and/or silicon bonded OH content. For example, the solid capped resin (A-1) may be present in an amount of 50% or more, 60% or more, 70% or more, 80% or more, 90% or more, 95% or more, or even 100%, by weight based on the weight of starting material (A). The solid uncapped resin (A-2) may be present in an amount of 50% or less, 40% or less, 30% or less, 20% or less, 10% or less, 5% or less, or even zero, by weight based on the weight of starting material (A). The solid polyorganosilicate resin component may consist of the solid capped resin (A-1) and the solid uncapped resin (A-2) above, i.e., the total concentration of (A-1) and (A-2) may be equal to 100% by weight based on the weight of starting material (A).

The process for preparing the solventless PSA composition of the present invention also comprises (ii) mixing starting material (A) above with starting material (B) and optionally starting material (C). The resulting mixture is further cooled to form a silicone base part (e.g., step (iii) of the process).

Starting material (B) useful in the present invention is an aliphatically unsaturated polydiorganosiloxane (B-1), a branched polyorganosiloxane (B-2), or a mixture of (B-1) and (B-2).

The aliphatically unsaturated polydiorganosiloxane (B-1) useful in the present invention comprises unit formula (II-1):

$$(R^1_2R^2SiO_{1/2})_x(R^1_3SiO_{1/2})_y(R^1R^2SiO_{2/2})_z(R^1_2SiO_{2/2})_w,$$

where each $R^1$ is independently a monovalent hydrocarbon group of from 1 to 20 carbon atoms that is free of aliphatic unsaturation; each $R^2$ is independently a monovalent aliphatically unsaturated hydrocarbon group of from 2 to 20 carbon atoms; $x>0$, $y≥0$, $(x+y)=2$, $z≥0$, $w≥0$, $(w+z)>0$, and the value of $(x+y+z+w)$ is sufficient to give the aliphatically unsaturated polydiorganosiloxane a Mn of from 5,000 to 50,000 g/mol as measured by GPC analysis. For example, Mn of the aliphatically unsaturated polydiorganosiloxane (B-1) can be 5,200 g/mol or more, 5,500 g/mol or more, 5,800 g/mol or more, 6,000 g/mol or more, 6,200 g/mol or more, 6,500 g/mol or more, or even 7,000 g/mol or more, and at the same time, 48,000 g/mol or less, 45,000 g/mol or less, 40,000 g/mol or less, g/mol or less, 30,000 g/mol or less, 25,000 g/mol or less, 20,000 g/mol or less, or even 18,000 g/mol or less. GPC analysis can be conducted according to the test method described in the Examples section below. The value of (w+z) may be 50 or higher, 100 or higher, 150 or higher, 200 or higher, or even 300 or higher, and at the same time, 600 or lower, 500 or lower, 450 or lower, or even 400 or lower.

$R^1$ typically has from 1 to 20 carbon atoms, from 1 to 15 carbon atoms, from 1 to 12 carbon atoms, from 1 to 10 carbon atoms, from 1 to 6 carbon atoms, from 1 to 3 carbon atoms, or from 1 to 2 carbon atoms. Suitable monovalent hydrocarbon groups for $R^1$ are exemplified by alkyl groups and aromatic groups such as aryl groups and aralkyl groups as described above. Each $R^1$ may be independently an alkyl group of from 1 to 6 carbon atoms. At least 50 mol %, 60 mol % or more, 70 mol % or more, or even 80 mol % or more of the monovalent hydrocarbon group represented by $R^1$ can be methyl. Mole percentage of methyl herein can be determined by NMR analysis. Preferably, each $R^1$ is methyl.

$R^2$ typically has from 2 to 20 carbon atoms, from 2 to 10 carbon atoms, from 2 to 8 carbon atoms, or from 2 to 6 carbon atoms. The monovalent aliphatically unsaturated hydrocarbon group for $R^2$ can be an alkenyl group. Examples of suitable alkenyl groups for $R^2$ include vinyl, allyl, propenyl (e.g., isopropenyl, and/or n-propenyl); and butenyl, pentenyl, hexenyl, and heptenyl, and branched and linear isomers thereof; and cyclohexenyl. Preferably, the alkenyl group is vinyl. The alkenyl groups in the aliphatically unsaturated polydiorganosiloxane may be located at terminal, pendant, or both terminal and pendant positions.

Examples of suitable aliphatically unsaturated polydiorganosiloxanes (B-1) include b1) dimethylvinylsiloxy-terminated polydimethylsiloxane, b2) dimethylvinylsiloxy-terminated poly(dimethylsiloxane/methylvinylsiloxane), b3) dimethylvinylsiloxy-terminated polymethylvinylsiloxane, b4) trimethylsiloxy-terminated poly(dimethylsiloxane/methylvinylsiloxane), b5) trimethylsiloxy-terminated polymethylvinylsiloxane, b6) dimethylvinylsiloxy-terminated poly(dimethylsiloxane/methylvinylsiloxane), b7) dimethylvinylsiloxy-terminated poly(dimethylsiloxane/methylphenylsiloxane), b8) dimethylvinylsiloxy-terminated poly(dimethylsiloxane/diphenylsiloxane), b9) phenyl, methyl, vinyl-siloxy-terminated polydimethylsiloxane, b10) dimethylhexenylsiloxy-terminated polydimethylsiloxane, b11) dimethylhexenylsiloxy-terminated poly(dimethylsiloxane/methylhexenylsiloxane), b12) dimethylhexenylsiloxy-terminated polymethylhexenylsiloxane, b13) trimethylsiloxy-terminated poly(dimethylsiloxane/methylhexenylsiloxane), b14) trimethylsiloxy-terminated polymethylhexenylsiloxane, b15) dimethylhexenylsiloxy-terminated poly(dimethylsiloxane/methylhexenylsiloxane), b16) dimethylvinylsiloxy-terminated poly(dimethylsiloxane/methylhexenylsiloxane), or combinations thereof. Preferably, the aliphatically unsaturated polydiorganosiloxane (B-1) is selected from the group consisting of b1) dimethylvinylsiloxy-terminated polydimethylsiloxane, b2) dimethylvinylsiloxy-terminated poly(dimethylsiloxane/ methylvinylsiloxane), or a combination of b1) and b2). The aliphatically unsaturated polydiorganosiloxanes are known in the art and may be prepared by methods such as hydrolysis and condensation of the corresponding organohalosilanes or equilibration of cyclic polydiorganosiloxanes.

The branched polyorganosiloxane (B-2) useful in the present invention comprises unit formula (II-2):

$$(R^1_3SiO_{1/2})_g(R^1_2R^2SiO_{1/2})_h(R^1_2SiO_{2/2})_i(SiO_{4/2})$$

where $R^1$ and $R^2$ are as described above, and g, h, and i have values such that $2 \geq g \geq 0$, $4 \geq h \geq 0$, $995 \geq i \geq 4$, $(g+h)=4$, and the value of $(g+h+i)$ is sufficient to give the branched polyorganosiloxane a Mn of from 5,000 to 50,000 g/mol as determined by GPC analysis. GPC analysis can be conducted according to the test method described in the Examples section below. For example, Mn of the branched polydiorganosiloxane (B-2) can be g/mol or more, 5,500 g/mol or more, 5,800 g/mol or more, 6,000 g/mol or more, 6,200 g/mol or more, 6,500 g/mol or more, or even 7,000 g/mol or more, and at the same time, 48,000 g/mol or less, 45,000 g/mol or less, 40,000 g/mol or less, 35,000 g/mol or less, 30,000 g/mol or less, 25,000 g/mol or less, 20,000 g/mol or less, or even 18,000 g/mol or less. The value of i may be 50 or higher, 100 or higher, 150 or higher, 200 or higher, or even 250 or higher, and at the same time, 600 or lower, 500 or lower, 400 or lower, or even 300 or lower. Method of preparing branched polyorganosiloxane (B-2) and examples of suitable branched polyorganosiloxane (B-2) are disclosed, for example, in U.S. Pat. No. 6,806,339 and US Patent Publication 2007/0289495.

Starting material (B) can be a single aliphatically unsaturated polydiorganosiloxane (B-1), a mixture comprising two or more aliphatically unsaturated polydiorganosiloxanes that differ in at least one of the following properties: structure, Mn, siloxane units, and sequence, a single branched polyorganosiloxane (B-2), a mixture of two or more branched polyorganosiloxanes that differ in at least one of the following properties: structure, Mn, siloxane units, and sequence; or mixtures thereof. (B-1) and/or (B-2) may be present in amounts to provide starting material (B) with a viscosity of 4,000 mPa·s or less, 3,500 mPa·s or less, 3,000 mPa·s or less, 2,500 mPa·s or less, 2,000 mPa·s or less, or even 1,500 mPa·s or less, and at the same time, 200 mPa·s or more, 300 mPa·s or more, 400 mPa·s or more, or even 500 mPa·s or more, at room temperature as measured by a rotational viscometer. Viscosity can be determined according to the test method described in the Examples section below.

Starting material (B) useful in the present invention may be present, by weight based on the total weight of starting materials in the solventless PSA composition, in an amount of 46% or more, 47% or more, 48% or more, 49% or more, 50% or more, 51% or more, 52% or more, 53% or more, 54% or more, 55% or more, 60% or more, 62% or more, or even 65% or more, and at the same time, 90% or less, 85% or less, 80% or less, 75% or less, 74% or less, 73% or less, or even 70% or less. Total weight of starting materials in the solventless PSA composition can be combined weight of starting materials (A) to (E) and starting materials (F) and (G) if present as described below.

Starting material (C) useful in the present invention is a polydiorganosiloxane gum of unit formula (III):

$$(R^1{}_2R^GSiO_{1/2})_2(R^1{}_2SiO_{2/2})_d$$

where $R^1$ is as described above; each $R^G$ is independently a monovalent aliphatically unsaturated hydrocarbon group of from 2 to 20 carbon atoms, hydroxyl, or combinations thereof; and d has a value sufficient to give the polydiorganosiloxane gum a Mn of 300,000 g/mol or more, for example, 350,000 g/mol or more, 400,000 g/mol or more, 450,000 g/mol or more, 500,000 g/mol or more, and at the same time, 1,000,000 g/mol or less, 900,000 g/mol or less, 800,000 g/mol or less, 700,000 g/mol or less, or even 600,000 g/mol or less, as measured by GPC analysis. GPC analysis can be conducted according to the test method described in the Examples section below. For example, the value of d may be 4,000 or higher, 4,500 or higher, or higher, 5,500 or higher, or even 6,000 or higher, and at the same time, 10,000 or lower, 9,000 or lower, 8,000 or lower, or even 7,000 or lower.

$R^1$ is as described above in the section of starting material (B) above. The aliphatically unsaturated hydrocarbon groups represented by $R^G$ typically have from 2 to 20 carbon atoms, from 2 to 10 carbon atoms, from 2 to 8 carbon atoms, or from 2 to 6 carbon atoms. The aliphatically unsaturated hydrocarbon group can be alkenyl. Examples of suitable alkenyl groups represented by $R^G$ include vinyl, allyl, propenyl (e.g., isopropenyl, and/or n-propenyl); and butenyl, pentenyl, hexenyl, and heptenyl, and branched and linear isomers thereof; and cyclohexenyl. Preferably, the alkenyl group is vinyl. The alkenyl groups and/or hydroxyl groups in the polydiorganosiloxane gum may be located at terminal positions. Starting material (C) can be a mixture of two or more different polydiorganosiloxane gums.

Examples of suitable polydiorganosiloxane gums include C1) dimethylvinylsiloxy-terminated polydimethylsiloxane, C2) dimethylvinylsiloxy-terminated poly(dimethylsiloxane/methylphenyl)siloxane, C3) dimethylvinylsiloxy-terminated poly(dimethylsiloxane/diphenyl)siloxane, C4) phenyl, methyl,vinyl-siloxy-terminated polydimethylsiloxane, C5) dimethylhexenylsiloxy-terminated polydimethylsiloxane, C6) dimethylhexenyl-siloxy terminated poly(dimethylsiloxane/methylphenyl)siloxane, C7) dimethylhexenylsiloxy-terminated poly(dimethylsiloxane/diphenyl)siloxane, C8) hydroxyl-terminated polydimethylsiloxane, C9) hydroxyl-terminated poly(dimethylsiloxane/methylphenyl)siloxane, C10) hydroxyl-terminated poly(dimethylsiloxane/diphenyl) siloxane, or mixtures thereof.

Starting material (C) useful in the present invention may be present, by weight based on the total weight of all starting materials in the solventless PSA composition, in an amount of zero or more, 0.1% or more, 0.2% or more, 0.5% or more, 0.8% or more, 1% or more, 1.5% or more, or even 2% or more, and at the same time, 6% or less, 5.5% or less, 5% or less, 4% or less, 2.3% or less, 2% or less, or even 1.6% or less.

Starting materials (A), (B), and (C) are present in amounts to provide a weight ratio of (A):[(B)+(C)], i.e., the amount of starting material (A) to combined amounts of starting materials (B) and (C), referred to as R/P ratio, in the range of from 0.1 to 1.2, from 0.15 to 1.1, from 0.2 to 1.0, from 0.25 to 0.9, or from 0.3 to 0.8.

The process for preparing the solventless PSA composition of the present invention also comprises (iv) admixing the silicone base part obtained above with other starting materials including starting materials (D) and (E), and optionally starting materials (F) and/or (G), to form the solventless PSA composition.

Starting material (D) useful in the present invention is one or more polyorganohydrogensiloxane. Starting material (D) acts as a crosslinker in the hydrosilylation reaction of the solventless PSA composition. The polyorganohydrogensiloxane typically has at least 2 or at least 3 silicon bonded hydrogen atoms per molecule. The polyorganohydrogensiloxane may comprise unit formula (IV):

$$(R^1{}_3SiO_{1/2})_2(R^1{}_2SiO_{2/2})_e(HR^1{}_2SiO_{2/2})_f$$

where $R^1$ is as described above, $e{\geq}0$, $f{\geq}3$, and $(e+f)$ is from 4 to 500.

$R^1$ is as described in the starting material (B) section above. Preferably, each $R^1$ is independently an alkyl of from 1 to 6 carbon atoms, more preferably, methyl. The value of $(e+f)$ may be 4 or higher, 5 or higher, 7 or higher, 10 or higher, 20 or higher, 30 or higher, 40 or higher, or even 50 or higher, and at the same time, 500 or lower, 400 or lower, 200 or lower, 150 or lower, 140 or lower, 130 or lower, 120 or lower, 110 or lower, or even 100 or lower.

The polyorganohydrogensiloxane useful in the present invention may comprise the silicon bonded hydrogen atoms in an amount of 0.38% or more, 0.5% or more, 0.6% or more, or even 0.75% or more, and at the same time, 2% or less, 1.9% or less, 1.8% or less, 1.75% or less, 1.7% or less, or even 1.6% or less, by weight based on weight of the polyorganohydrogensiloxane. The content of silicon bonded hydrogen atoms can be determined by NMR analysis.

Methods of preparing polyorganohydrogensiloxanes, such as hydrolysis and condensation of organohydridohalosilanes, are well known in the art. Examples of suitable polyorganohydrogensiloxanes include D1) trimethylsiloxy-terminated poly(dimethyl/methylhydrogen)siloxane, D2) trimethylsiloxy-terminated polymethylhydrogensiloxane, D3) dimethylhydrogensiloxy-terminated polydimethylsiloxane, D4) dimethylhydrogensiloxy-terminated poly(dimethylsiloxane/methylhydrogensiloxane, D5) dimethylhydrogensiloxy-terminated polymethylhydrogensiloxane, or combinations thereof.

Starting material (B) is present in an amount sufficient to provide a molar ratio of silicon bonded hydrogen atoms to aliphatically unsaturated hydrocarbon groups in all starting materials containing aliphatically unsaturated hydrocarbon groups in the solventless PSA composition, referred to as SiH/Vi ratio, of from 1 to 10, from 1.1 to 8, from 1.2 to 7, from 1.3 to 6, from 1.4 to 5, or from 1.5 to 4. Typically, starting material (B) is present in an amount of 0.1% or more, 1% or more, or even 2% or more, and at the same time, 5% or less, 4% or less, or even 3% or less, by weight based on the total weight of starting materials containing aliphatically unsaturated hydrocarbon groups in the solventless PSA composition.

Starting material (E) useful in the present invention is a hydrosilylation reaction catalyst. The hydrosilylation reaction catalyst can promote the addition reaction of starting material (B) with starting material (D). Hydrosilylation reaction catalysts may include platinum group metal catalysts. Such hydrosilylation reaction catalysts may comprise (E1) a metal selected from platinum, rhodium, ruthenium, palladium, osmium, and iridium, preferably, platinum; (E2) a compound of such a metal including, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, or platinum dichloride, (E3) a complex of the platinum group metal compound with a low molecular weight organopolysiloxane, (E4) the platinum group metal compound microencapsulated in a matrix or core-shell type structure, or a combination thereof, (E5) the complex microencapsulated in a resin matrix, or a combination thereof. Complexes of platinum with low molecular weight organopolysiloxanes include 1,3-diethenyl-1,1,3,3-tetramethyldisiloxane complexes with platinum (Karstedt's Catalyst). Exemplary hydrosilylation reaction catalysts are described in U.S. Pat. Nos. 3,159,601 and 3,220,972.

The concentration of the hydrosilylation reaction catalyst is sufficient to catalyze hydrosilylation reaction of silicon bonded hydrogen atoms and aliphatically unsaturated groups in the solventless PSA composition. Typically, the concentration of the hydrosilylation reaction catalyst is sufficient to provide 1 part per million (ppm) or more, 5 ppm or more, 10 ppm or more, 20 ppm or more, or even 30 ppm or more, at the same time, 6,000 ppm or less, ppm or less, 4,000 ppm or less, 3,000 ppm or less, 2,000 ppm or less, 1,000 ppm or less, 500 ppm or less, 100 ppm or less, or even 50 ppm or less, of a platinum group metal, by weight based on the total weight of starting materials in the solventless PSA composition.

Starting material (F) useful in the present invention is a hydrosilylation reaction inhibitor that may optionally be used for altering rate of reaction of the silicon bonded hydrogen atoms and the aliphatically unsaturated groups in the solventless PSA composition, as compared to reaction rate of the same starting materials but with the inhibitor omitted. Examples of suitable hydrosilylation reaction inhibitors include acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol (ETCH), and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclooctadiene, divinyltetramethyldisiloxane; alcohols such as benzyl alcohol; or mixtures thereof.

The hydrosilylation reaction inhibitor useful in the present invention may be present in an amount of zero or more, 0.01% or more, 0.1% or more, 0.2% or more, 0.3% or more, or even 1% or more, and at the same time, 5% or less, 4% or less, 3% or less, or even 2% or less, by weight based on the total weight of starting materials in the solventless PSA composition.

Starting material (G) useful in the present invention is an anchorage additive. The anchorage additive may comprise an alkoxysilane, a reaction product of a vinyl acetoxysilane and epoxy-functional alkoxysilane, a blend and/or a reaction product of alkoxysilane and a polyorganosiloxane having at least one aliphatically unsaturated hydrocarbon group and at least one hydrolyzable group per molecule and an epoxy-functional alkoxysilane (e.g., a blend and/or a reaction product of a hydroxy-terminated, vinyl functional polydimethylsiloxane with glycidoxypropyltrimethoxysilane), or mixtures thereof. The alkoxysilane can be an unsaturated or epoxy-functional alkoxysilane, methyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilyl)hexane; tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, or mixtures thereof. Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane, or mixtures thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyl oxypropyl trimethoxysilane, 3-methacryloyloxypropyl triethoxysilane, 3-acryloyloxypropyl trimethoxysilane, 3-acryloyloxypropyl triethoxysilane, or mixtures thereof. Suitable commercially available anchorage additives may include, for example, SYL-OFF™ 297, SYL-OFF™ 397, and SYL-OFF™ SL 9250 all available from Dow Silicones Corporation of Midland, Michigan, USA (SYL-OFF is a trademark of Dow Silicones Corporation).

Particularly, examples of anchorage additives include (G1) vinyltriacetoxysilane, (G2) glycidoxypropyltrimethoxysilane, (G3) a blend or reaction product of (G1) and (G2), and (G4) a blend or reaction product of (G3) and a polydimethylsiloxane terminated with hydroxyl groups, methoxy groups, or terminated with both a hydroxy group and a methoxy group.

The anchorage additive useful in the present invention may be present in an amount of zero or more, 0.01% or more, 0.05% or more, 0.1% or more, or even 0.5% or more, and at the same time, 5% or less, 4.5% or less, 4% or less, 3.5% or less, 3% or less, 2.5% or less, 2% or less, 1.5% or less, or even 1% or less, by weight based on the total weight of starting materials in the solventless PSA composition.

The process for preparing the solventless PSA composition of the present invention comprises (i) providing starting material (A), starting material (B), and optionally one or more other additional starting material described above such as starting material (C), and (ii) mixing starting materials (A) and (B), and optionally starting material (C), at a temperature of 100° C. or higher, for example, 110° C. or higher, 120° C. or higher, 130° C. or higher, 140° C. or higher, or even 150° C. or higher, and at the same time, 230° C. or lower, 220° C. or lower, 210° C. or lower, 200° C. or lower, 190° C. or lower, or even 180° C. or lower. The solid polyorganosilicate resin (e.g., (A-1) and (A-2)) for starting material (A) may be as a flake or powder when mixed with starting material (B) and optionally starting material (C).

Mixing temperature in step (ii) can be selected so as to form a homogenous mixture, which is typically clear to the naked eye. "Homogenous mixture" herein refers to a mixture showing no phase separation or layering as observed by the naked eye. Mixing of starting materials can be accomplished by any of the techniques known in the art such as milling, blending, extruding, and stirring, either in a batch or continuous process. Time duration for mixing the starting materials above may depend on the molecule weight and concentrations of starting materials (A) and (B), and/or mixing methods, for example, from 10 minutes to 4 hours, from 0.5 hour to 2 hours, or from 1 hour to 2 hours.

The process for preparing the solventless PSA composition of the present invention further comprises (iii) cooling the resulting mixture obtained from step (ii) to form a silicone base part. Temperatures for cooling can be 60° C. or lower, 50° C. or lower, 40° C. or lower, 30° C. or lower, or even 25° C. or lower. The silicone base part is liquid at room temperature, which is typically a homogenous mixture. The silicone base part has a viscosity of less than 5,000 mPa·s at room temperature when measured by a rotational viscometer, for example, a viscosity of 4,950 mPa·s or less, 4,900 mPa·s or less, 4,800 mPa·s or less, 4,500 mPa·s or less, 4,000 mPa·s or less, 3,500 mPa·s or less, 3,000 mPa·s or less, 2,500 mPa·s or less, or even 2,000 mPa·s or less. Viscosity can be determined according to the test method described in the Examples section below.

The process for preparing the PSA composition of the present invention further comprises (iv) admixing the silicone base part obtained from step (iii) with starting materials (D) the hydrosilylation reaction catalyst and (E) the polyorganohydrogensiloxane, and optionally other additional starting materials including the hydrosilylation reaction inhibitor and/or the anchorage additive. When present, the hydrosilylation reaction inhibitor may be added to the silicone base part before the hydrosilylation reaction catalyst, for example, when the solventless PSA composition will be prepared as a one part composition. The process for preparing the solventless PSA composition can be used for preparing a multipart composition comprising at least the silicone base part obtained from step (iii) of the process described above and a curing agent part. The curing agent part may be prepared by combining starting materials comprising at least the hydrosilylation reaction catalyst, the polyorganohydrogensiloxane, and optionally other additional starting materials described above. The hydrosilylation reaction inhibitor may be included in one or more of the silicone base part, the curing agent part, or a separate additional part. The anchorage additive may be added to the silicone base part and/or the curing agent part, or may be added as a separate additional part. The parts are combined shortly before use of the solventless PSA composition. When a two part composition is used, the weight ratio of amounts of base part to curing agent part may range from 1:1 to 10:1.

The process for preparing the solventless PSA composition of the present invention can be conducted in the substantial absence of a solvent, i.e., solvent is not intentionally added during preparation of the solventless PSA composition. For example, the process of the present invention does not require addition of a solvent to dissolve one or more of the starting materials such as the solid polyorganosilicate resin component) in the solventless PSA composition and/or addition of a solvent to the silicone base part. "Substantial absence of a solvent" refers to 100 ppm or less, 80 ppm or less, 50 ppm or less, or even zero of a solvent, by weight based on the total weight of starting materials in the solventless PSA composition. The content of solvent can be measured by gas chromatography (GC). "Solvent" herein refers to any compound that can dissolve the solid polyorganosilicate resin component (starting material (A)), i.e., the polyorganosilicate resin component is soluble in the solvent. The solvent may be an organic solvent such as an aliphatic or aromatic hydrocarbon, which is saturated or unsaturated, such as benzene, toluene, xylene, hexane, heptane, octane, iso-paraffin, hydrocarbon compounds of 8 to 18 carbon atoms and at least one aliphatic unsaturation per molecule such as tetradecene; a ketone such as acetone, methyl ethyl ketone, or methyl isobutyl ketone; an ester acetate such as ethyl acetate or isobutyl acetate; an ether such as a glycol ether such as propylene glycol methyl ether, dipropylene glycol methyl ether, and propylene glycol n-butyl ether, diisopropyl ether or 1,4-dioxane; a cyclic siloxane having an average degree of polymerization from 3 to 10 such as hexamethylcyclotrisiloxane, octamethylcyclotetrasiloxane, and/or decamethylcyclopentasiloxane; or mixtures thereof.

Due to the substantial absence of the solvent, the process for preparing the solventless PSA composition does not involve (that is, is free of) an extra stripping procedure for removal of the solvent, e.g., stripping off the solvent. The process of the present invention enables the preparation of solventless PSA composition without the aid of a solvent while still affording the resulting solventless PSA composition with desired low viscosities as described below. The PSA composition prepared by the process of the present invention is solventless. The solventless PSA composition contains no solvent or may contain trace amounts of residual solvents from delivery of starting materials in the PSA composition, for example, less than 100 ppm of solvent, by weight based on the total weight of the solventless PSA composition (e.g., based on the total weight of starting materials in the solventless PSA composition). The content of residual solvent in the solventless PSA composition can be measured by gas chromatography (GC). The solventless PSA composition prepared by the process of the present invention can provide a low viscosity to make it applicable to coat the solventless PSA composition directly onto substrates without requiring addition of solvents to the solventless PSA composition before use. For example, the solventless PSA composition typically has a viscosity of less than 5,000 mPa·s at room temperature when measured within 0.5 hour of mixing all starting materials of the PSA composition together by a rotational viscometer, for example, a viscosity of 4,950 mPa·s or less, 4,900 mPa·s or less, 4,800 mPa·s or less, 4,500 mPa·s or less, 4,000 mPa·s or less, 3,500 mPa·s or less, 3,000 mPa·s or less, 2,500 mPa·s or less, or even 2,000 mPa·s or less. Viscosity can be determined according to the test method described in the Examples section below.

The present invention also relates to a pressure sensitive adhesive comprising a cured product of the solventless PSA composition, i.e., a pressure sensitive adhesive formed by curing the solventless PSA composition via hydrosilylation reaction. An adhesive article such as a film or tape may be prepared by applying the solventless PSA composition onto a substrate. The present invention also relates to a method of making an adhesive article such as a protective film, comprising: applying the solventless PSA composition to a substrate, and curing the solventless PSA composition. Applying the solventless PSA composition onto the substrate can be performed by various means including, for example, dispensing, spinning, a thin film coating, jetting, spraying, dipping, pouring, screen printing, or by the use of a brush, roller or coating bar such as gravure coater, comma coater, offset coater, offset-gravure coater, roller coater, reverse-roller coater, air-knife coater, or curtain coater. The substrate can be any material that can withstand the curing conditions described below used to cure the solventless PSA composition to form the PSA on the substrate. Suitable substrates may include, for example, polymeric films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), thermoplastic polyurethane (TPU), polyethylene (PE), or polypropylene (PP); glass cloth, aluminum foil, titanium, copper foil, nickel, silver, or gold. The substrate can be PET or PI films.

The method of making the adhesive article may optionally further comprise treating the substrate before applying the solventless PSA composition. Treating the substrate may be performed by any convenient means, such as applying a primer, or subjecting the substrate to corona-discharge treatment, etching, or plasma treatment before applying the solventless PSA composition to the substrate.

Due to the absence of a solvent in the process for preparing the solventless PSA composition of the present invention, the method of making the adhesive article does not include (i.e., free of) the step of removing a solvent, e.g., before and/or during curing the solventless PSA composition. Curing the solventless PSA composition may be conducted at elevated temperatures up to 200° C., for example, from 80 to 200° C., from 100 to 160° C., or from 110 to 150° C., for a time sufficient to cure the solventless PSA composition, e.g., from 30 seconds to an hour or from 1 to 5 minutes. This forms a pressure sensitive adhesive on the substrate. The amount of the solventless PSA composition to be applied to the substrate depends on the specific application, for example, the amount may be sufficient such that, after curing, film thickness of the pressure sensitive adhesive may be from 5 microns (µm) to 100 µm, from 6 µm to 50 µm, from 8 µm to 40 µm, or from 10 µm to 30 µm.

The method of making the adhesive article of the present invention may optionally further comprise applying a removable release liner to the PSA opposite the substrate such that the PSA residing between the substrate and the release liner. The release liner may be applied before, during or after curing the solventless PSA composition.

The adhesive article prepared as described above is useful in electronics applications such as display devices. The solventless PSA composition of the present invention may cure to form the PSA with peel adhesion on glass or stainless steel of 20 g/in (7.87 gram per centimeter) or less, for example, from 0.5 g/in to 20 g/in, from 1 g/in to 15 g/in, from 3 g/in to 10 g/in. The low adhesion to glass and stainless steel properties of the PSA prepared from the solventless PSA composition make the protective film suitable for use for surface protection of electronic devices, such as screen or other surface protection during shipment of the device, such as a smartphone or tablet, or at an end user for screen protection of such a device. The adhesive article may be a protective film useful for protection of display glass.

EXAMPLES

Some embodiments of the invention will now be described in the following Examples, wherein all parts and percentages are by weight unless otherwise specified.

The following materials given in Table 1 except ETCH (available from BASF) and tetradecene (available from BP) are all available from Dow Silicones Corporation.

TABLE 1

| Ingredient | Chemical Description* |
|---|---|
| Solid Resin 1 | Methyl capped polymethylsilicate resin (molar ratio M/Q units = 51:49, silicon bonded OH content = 0.9 wt %, and Mn = 2,800 g/mol) |
| Solid Resin 2 | Methyl capped polymethylsilicate resin (molar ratio of M/Q units = 49:51, silicon bonded OH content = 1 wt %, and Mn = 3,700 g/mol) |
| Solid Resin 3 | Hydroxy-terminated uncapped polymethylsilicate resin (molar ratio of M/Q units = 42:58, silicon bonded OH content = 3.4 wt %, and Mn = 4,200 g/mol) |
| Solid Resin 4 | Methyl capped polymethylsilicate resin (molar ratio of M/Q units = 49:51, silicon bonded OH content = 1.1 wt %, and Mn = 4,913 g/mol) |
| Gum 1 | Dimethylvinylsiloxy-terminated polydimethylsiloxane of unit formula $M^{Vi}D_{5471}M^{Vi}$ (vinyl content = 0.0133 wt %) |
| Gum 2 | Hydroxy-terminated polydimethylsiloxane of unit formula $HOD_{3857}OH$ |
| Gum 3 | Dimethylvinylsiloxy-terminated polydimethyl, methylvinyl siloxane of unit formula $M^{Vi}D_{5462}D^{Vi}_{7.5}M^{Vi}$ (vinyl content = 0.06 wt %) |
| Vinyl Polymer 1 | Dimethylvinylsiloxy-terminated polydimethylsiloxane of unit formula $M^{Vi}D_{193}M^{Vi}$ (vinyl content = 0.47%, Mn = 10,733 g/mol, and viscosity = 456 mPa · s) |
| Vinyl Polymer 2 | Dimethylvinylsiloxy-terminated polydimethylsiloxane of unit formula $M^{Vi}D_{290}M^{Vi}$ (vinyl content = 0.23 wt %, Mn = 15,208 g/mol, and viscosity = 2,000 mPa · s) |
| Vinyl Polymer 3 | Dimethyl cyclics with tetrakis (vinyl dimethylsiloxy) silane of unit formula $M^{Vi}D_{160}Q$ (vinyl content = 0.9 wt %, Mn = 7,052 g/mol, and viscosity = 194 mPa · s) |
| Vinyl Polymer 4 | Dimethyl cyclics with tetrakis (vinyl dimethylsiloxy) silane of unit formula $M^{Vi}D_{220}Q$ (vinyl content = 0.64 wt %, Mn = 9,838 g/mol, and viscosity = 411 mPa · s) |
| Vinyl Polymer 5 | Dimethyl cyclics with tetrakis (vinyl dimethylsiloxy) silane of unit formula $M^{Vi}_{3.6}M_{0.4}D_{164}Q$ (vinyl content = 0.8 wt %, Mn = 7,002 g/mol, and viscosity = 159 mPa · s) |
| Anchorage additive 1 | Reaction products of vinyltriacetoxy silane and glycidoxypropyltrimethoxy silane |
| Anchorage additive 2 | Reaction products of vinyltriacetoxysilane and glycidoxypropyltrimethoxysilane polymer with hydroxy-terminated dimethyl, methylvinyl siloxane; alpha-hydroxy-, omega-methoxy-terminated dimethyl, methylvinyl siloxane; and hydroxy-terminated dimethyl siloxane |
| Inhibitor | 1-Ethynyl-1-cyclohexanol (ETCH) |
| Crosslinker 1 | Trimethylsiloxy-terminated poly(dimethyl, methylhydrogen) siloxane of unit formula $MD_{3.34}D'_{5.32}M$ |
| Crosslinker 2 | Trimethylsiloxy-terminated polymethylhydrogen siloxane of unit formula $MD'_{34}M$ |
| Catalyst | SYL-OFF ™ 4000 catalyst (containing 5,200 ppm platinum (Pt)) |
| Solvent | Tetradecene |

*Viscosity was measured according to the test method described below. Mn was measured by GPC described below. Silicon bonded OH content and vinyl content in wt % (weight percent) were determined by NMR analysis describe below. M denotes $(CH_3)_3SiO_{1/2}$–, D denotes $(CH_3)_2SiO_{2/2}$–, D' denotes $(CH_3)_2HSiO_{2/2}$–, Q denotes $SiO_{4/2}$–, $M^{Vi}$ denotes $(CH_3)_2(CH_2=CH)$–$SiO_{1/2}$–, and $D^{Vi}$ denotes $(CH_3)(CH_2=CH)$–$SiO_{2/2}$–.

The following standard analytical equipment and methods are used in the Examples and in determining the properties and characteristics stated herein:

NMR Analysis $^{29}$Si NMR technique described in U.S. Pat. No. 9,593, 209, Reference Example 2 at col. 32 was used to measure the weight percentage of silicon bonded hydroxyl groups, mole percentage of methyl, amounts of M to Q units, content of silicon bonded hydrogen atoms, and vinyl content).

Gel Permeation Chromatography (GPC) Analysis

Number average molecular weight (Mn) of starting material (A) was determined using GPC analysis as follows. The sample was diluted in high-performance liquid chromatography (HPLC) grade ethyl acetate (~10 milligrams per milliliter (mg/mL)), filtered with a 0.45 μm polytetrafluoroethylene (PTFE) filter and analyzed by GPC. Injection volume for the sample was 100 microliters (4). Columns used in this analysis included one PLgel Mixed D, one PLgel Mixed E and a guard column. Columns and all detectors were heated to 35° C. ASTM Certified Polystyrene, 113,500 weight average molecular weight (Mw), was used for instrument calibration (100 μL injection). A Viscotek TDA-305 Triple Detector Array was used along with a Viscotek GPCmax auto sampler for data collection. Omni Sec version 4.6 was utilized for data acquisition.

Mn of starting materials (B) and (C) was determined using GPC analysis as follows. The chromatographic equipment consisted of a Waters 2695 Separations Module equipped with a vacuum degasser, and a Waters 2414 refractive index detector. The separation was made with three Styragel™ HR columns (300 millimeter (mm)×7.8 mm) (molecular weight separation range of 100 to 4,000, 000), preceded by a Styragel™ guard column (30 mm×4.6 mm), Styragel is a trademark of Waters Technologies Corporation. The analyses were performed using certified grade tetrahydrofuran (THF) flowing at 1.0 milliliter per minute (mL/min) as the eluent, and the columns and detector were both heated to 35° C. 1.0% wt./v sample was prepared by weighing 0.050 gram into a glass vial (8 mL) and diluting with 5 mL THF. Sample solution was transferred to a glass autosampler vial after filtered through 0.45 μm PTFE filter. An injection volume of 100 μL was used and data was collected for 37 minutes (min). Data collection was performed using Waters Empower GPC software. Data analyses were performed using Agilent Cirrus software. Molecular weight averages were determined relative to a calibration curve (3$^{rd}$ order) created using polystyrene standards covering the molecular weight range of 474-1,270,000.

Adhesion Testing

At least 50 grams of a silicone PSA composition sample were applied on a polyethylene terephthalate (PET) film by using a four bird bar, and then cured in an oven at 140° C. for 2 min. After curing, coating thickness of the resulting PSA was measured by a micrometer and given in Table 2. The resulting film with the silicone PSA was cooled and cut into one-inch wide tapes.

These tape samples were laminated onto clean substrates by using a 2 kilogram (kg) roller back and forth twice such that the silicone PSA contacted the substrates, and then kept at ° C. for 24 hours before testing. The substrates were stainless steel (SS) or glass. Each tape sample was then tested for adhesion to the substrates by peeling each tape from the substrate at a 180 degree (180°) angle and a speed of 12 inches per minute (0.3 meter per minute) on a TMI Release and Adhesion Tester. Units for adhesion on the substrates are reported in g/in. Results are given in Table 2.

Viscosity

Determine viscosity by using a rotational viscometer (Brookfield RVDV-I+ PRO Viscometer) with spindle #6 at a speed of 10 revolutions per minute (rpm) at room temperature of 23±2° C.

Gas Chromatography (GC)

GC was used to determine residual solvents. A sample (0.05 gram) was added into a 2 mL vial and then treated with 1 mL of hexane to form a hexane solution (10 μL dodecane was used as an internal standard). The hexane solution was analyzed using GC with flame ionization detection. Experimental relatively response factors (RRF=0.934 for xylene) were employed for calculation. GC instrument conditions and parameters used were as follows, GC Instrument: Agilent 6890N; Oven: 40° C. (3 min) to 310° C. (35 min) at 15° C./min; Inlet: 280° C., 18.5 psi, split 20:1; Column: DB-5 MS UI, 30 meters (m)×0.25 mm×0.25 μm; Detector: FID, Temperature: 300° C., $H_2$ flow: 40.0 mL/min, Air flow: 450.0 mL/min, Makeup flow: 45 mL/min; and Injection volume: 1.0 μL.

Examples (Exs) 1-8

Based on formulations given in Table 2, solid resins and vinyl polymers (and/or gums when present) were added into a flask equipped with a stirrer and mixed with stirring. The contents of the flask were heated and kept at 150° C. for 2 hours under stirring and a clear homogenous mixture was obtained. The mixture in the flask was then cooled to room temperature to form a homogeneous liquid silicone base part. Viscosity of the silicone base part was measured according to the test method described above and results are given in Table 2.

ETCH inhibitor was then added into the base part and mixed for 5 min. Crosslinkers, catalysts, and anchorage additives were further added sequentially, and each starting material was mixed for at least 1 minute before adding another starting material. The resulting silicone PSA compositions were evaluated for adhesion properties according to the adhesion testing method described above.

As shown in Table 2, the base parts for the solventless PSA compositions of Exs 1-8 all showed viscosities of less than 5,000 mPa·s. The base part of Ex 1 had residual solvents of <0.2 ppm as measured by GC described above. The solventless PSA compositions of Exs 1-8 were directly coated to PET films and cured to form PSAs with adhesion of ≤20 g/in on stainless steel or glass, which are suitable for protective film applications.

TABLE 2

| | | | | | | | | | |
|---|---|---|---|---|---|---|---|---|---|
| Formulations and properties of solventless PSA compositions | | | | | | | | | |
| Ingredients, weight parts | | Ex 1 | Ex 2 | Ex 3 | Ex 4 | Ex 5 | Ex 6 | Ex 7 | Ex 8 |
| Base Part | Solid Resin 1 | 6.70 | 6.70 | | 8.78 | 6.39 | 6.70 | | |
| | Solid Resin 2 | 21.82 | 21.82 | | 28.60 | 20.81 | 21.82 | | |
| | Gum 1 | 1.51 | 1.51 | | 1.98 | 6.06 | 1.51 | | |

TABLE 2-continued

Formulations and properties of solventless PSA compositions

| Ingredients, weight parts | Ex 1 | Ex 2 | Ex 3 | Ex 4 | Ex 5 | Ex 6 | Ex 7 | Ex 8 |
|---|---|---|---|---|---|---|---|---|
| Solid Resin 4 | | | 25.93 | | | | 28.54 | 42.77 |
| Gum 3 | | | 1.34 | | | | 1.48 | 2.22 |
| Vinyl Polymer 1 | 49.78 | 49.78 | 52.53 | 40.36 | 47.48 | | | |
| Vinyl Polymer 2 | | | | | | 69.78 | 69.78 | |
| Vinyl Polymer 4 | 20.00 | | 20.00 | 20.08 | 19.08 | | | |
| Vinyl Polymer 3 | | 20.00 | | | | | | 54.81 |
| Inhibitor (ETCH) | 0.20 | 0.20 | 0.20 | 0.2 | 0.19 | 0.20 | 0.20 | 0.2 |
| Crosslinker 2 | | | 3.48 | 2.95 | 1.6 | 0.56 | 0.56 | 1.72 |
| Crosslinker 1 | 6.90 | 8.08 | | | | | | |
| Catalyst | 1.03 | 1.04 | 1.00 | 0.99 | 1.84 | 1.55 | 1.55 | 1.57 |
| Anchorage Additive 1 | 2.14 | 2.16 | 2.07 | 2.06 | 2.04 | 2.01 | 2.01 | 2.03 |
| R/P ratio | 0.4 | 0.4 | 0.34 | 0.52 | 0.4 | 0.40 | 0.4 | 0.75 |
| SiH/Vi ratio | 4 | 4 | 4 | 4 | 2 | 1.51 | 1.50 | 1.50 |
| Viscosity of Base Part (mPa · s) | 1,600 | 1,300 | 1,500 | 3,900 | 4,947 | 4,500 | 4,900 | 4,950 |
| Properties of PSA | | | | | | | | |
| Coating thickness after curing (μm) | 30 | 30 | 30 | 50 | 40 | 22 | 22 | 22 |
| PSA film appearance | Good | Good | Good | Good | Good | Good | Good | Good |
| Adhesion on SS for PSA tapes (g/inch) | 4 | 3.77 | 2.80 | 6.7 | 3.4 | / | / | / |
| Adhesion on glass for PSA tapes (g/inch) | 3.57 | 3.8 | 2.30 | 5.57 | 3.65 | 5.48 | 2.93 | 3.88 |

* PSA film appearance (i.e., coating appearance) was observed by the naked eye. If the surface of the PSA film is smooth and shows no fire pit, film appearance is defined as "Good". Otherwise, if fire fits are observed on the surface of the PSA film, film appearance is defined as "Unacceptable".
R/P ratio was calculated by dividing the sum of the weights of solid resins by the sum of the weights of gum and vinyl polymers.
SiH/Vi ratio was calculated by dividing the amount of silicon bonded hydrogen atoms from the Crosslinker by combined amounts of vinyl groups from starting materials including vinyl polymers and gum.

Comparative (Comp) Exs A and B

The base parts in Comp Exs A and B were prepared, respectively, according to the procedure as described in Ex 1, based on the formulations given in Table 3. Inhibitors, crosslinkers, catalysts, and anchorage additive as given in Table 3 were then added into the obtained base part sequentially. The resulting mixtures for Comp Exs A and B both gelled.

TABLE 3

Formulations of comparative silicone PSA compositions

| Ingredients, weight part | | Comp Ex A | Comp Ex B |
|---|---|---|---|
| Base Part | Solid Resin 3 | 23.28 | 23.28 |
| | Solid Resin 2 | 9.98 | 9.98 |
| | Gum 2 | 1.75 | 1.75 |
| | Vinyl Polymer 5 | 60.80 | / |
| | Vinyl Polymer 3 | / | 30.40 |
| | Vinyl Polymer 1 | 0.00 | 30.40 |
| | Solvent (Tetradecene) | 4 | 4 |
| | Inhibitor (ETCH) | 0.20 | 0.20 |
| Viscosity of Base Part (mPa · s) | | 800 | 1,100 |
| | SiH/Vi ratio | 4 | 4 |
| | R/P ratio | 0.5 | 0.5 |
| | Crosslinker 1 | 20.20 | 16.06 |
| | Catalyst | 1.16 | 1.12 |
| | Anchorage Additive 1 | / | 2.32 |
| | Anchorage Additive 2 | 2.40 | / |

*R/P ratio was calculated by dividing the sum of the weights of solid resins by the sum of the weights of gum and vinyl polymers.
SiH/Vi ratio was calculated by dividing the amount of silicon bonded hydrogen atoms from the crosslinker by combined amounts of vinyl groups from vinyl polymers and gum.

What is claimed is:

1. A process for preparing a solventless pressure sensitive adhesive composition comprising:

(i) providing starting material (A) a solid polyorganosilicate resin component comprising:

(A-1) more than 30% to 100% by weight, based on the weight of starting material (A), of a solid capped resin of unit formula (I-1):

$$(R^M{}_3SiO_{1/2})_a(SiO_{4/2})_b Z_c$$

where each $R^M$ is independently a monovalent hydrocarbon group of from 1 to 20 carbon atoms; each Z is independently a hydrolyzable group selected from the group consisting of alkoxy, hydroxyl, or mixtures thereof; c is from 0 to a value sufficient to give the capped resin a hydrolyzable group content up to 2% by weight based on the weight of the capped resin; and a and b have values such that a>4, b>0, and the value of (a+b) is sufficient to give the capped resin a number average molecular weight of from 500 to 8,000 g/mol; and (A-2) zero to less than 70% by weight, based on the weight of starting material (A), of a solid uncapped resin of unit formula of (I-2):

$$\left(R_M^3 SiO_{1/2}\right)_{a'}\left(SiO_{4/2}\right)_{b'} Z_{c'}$$

where $R^M$ and Z are as described above; a' and b' have values such that a'>4, b'>0, and the value of (a'+b') is sufficient to give the uncapped resin a number average molecular weight of from 500 to 8,000 g/mol; and c' has a value sufficient to give the uncapped resin a hydrolyzable group content of >2% to 10% by weight based on the weight of the uncapped resin;

(ii) mixing starting material (A) with starting material (B) and optionally starting material (C) at a temperature of 100° C. or higher;

wherein starting material (B) is an aliphatically unsaturated polydiorganosiloxane (B-1), a branched polyorganosiloxane (B-2), or a mixture of (B-1) and (B-2), wherein the aliphatically unsaturated polydiorganosiloxane (B-1) comprises unit formula (II-1):

$$(R^1_2R^2SiO_{1/2})_x(R^1_3SiO_{1/2})_y(R^1R^2SiO_{2/2})_z(R^1_2SiO_{2/2})_w$$

where each $R^1$ is independently a monovalent hydrocarbon group of from 1 to 20 carbon atoms that is free of aliphatic unsaturation; each $R^2$ is independently a monovalent aliphatically unsaturated hydrocarbon group of from 2 to 20 carbon atoms; x, y, z, and w have values such that x>0, y≥0, (x+y)=2, z≥0, w≥0, (w+z)>0, and the value of (x+y+z+w) is sufficient to give the aliphatically unsaturated polydiorganosiloxane a number average molecular weight of from 5,000 to 50,000 g/mol;

wherein the branched polyorganosiloxane (B-2) comprises unit formula (II-2):

$$(R^1_3SiO_{1/2})_g(R^1_2R^2SiO_{1/2})_h(R^1_2SiO_{2/2})_i(SiO_{4/2})$$

where $R^1$ and $R^2$ are as described above, and g, h, and i have values such that 2≥g ≥0, 4≥h≥0, 995≥i≥4, (g+h)=4, and the value of (g+h+i) is sufficient to give the branched polyorganosiloxane a number average molecular weight of from 5,000 to 50,000 g/mol;

wherein starting material (C) is a polydiorganosiloxane gum of unit formula (III):

$$(R^1_2R^GSiO_{1/2})_2(R^1_2SiO_{2/2})_d$$

where $R^1$ is as described above; each $R^G$ is independently a monovalent aliphatically unsaturated hydrocarbon group of from 2 to 20 carbon atoms, hydroxyl, or combinations thereof; and d has a value sufficient to give the polydiorganosiloxane gum a number average molecular weight of 300,000 g/mol or more;

wherein starting materials (A), (B), and (C) are present in amounts to provide a weight ratio of the amount of starting material (A) to combined amounts of starting materials (B) and (C) if present of from 0.1 to 1.2;

(iii) cooling the mixture obtained from step (ii) to form a silicone base part with a viscosity of less than 5,000 mPas at room temperature; and (iv) admixing the silicone base part obtained from step (iii) with starting material (D) a polyorganohydrogensiloxane, starting material (E) a hydrosilylation reaction catalyst, optionally starting material (F) a hydrosilylation reaction inhibitor, and optionally starting material (G) an anchorage additive; thus forming the solventless pressure sensitive adhesive composition, wherein the process is conducted in the substantial absence of a solvent.

2. The process of claim 1, wherein each $R^1$ is independently an alkyl group of from 1 to 6 carbon atoms and each $R^2$ is independently an alkenyl group of from 2 to 6 carbon atoms.

3. The process of claim 1, wherein the aliphatically unsaturated polydiorganosiloxane (B-1) and the branched polyorganosiloxane (B-2) each independently has a number average molecular weight of 5,500 to 20,000 g/mol.

4. The process of claim 1, wherein mixing in step (ii) is conducted at a temperature of from 120 to 230° C.

5. The process of claim 1, wherein starting material (B) has a viscosity of 3,000 mPa·s or less at room temperature.

6. The process of claim 1, wherein each $R^M$ is independently an alkyl group of from 1 to 6 carbon atoms.

7. The process of claim 1, wherein starting materials are present in amounts to provide a molar ratio of silicon bonded hydrogen atoms to aliphatically unsaturated groups in the solventless pressure sensitive adhesive composition of from 1 to 10.

8. The process of claim 1, wherein the weight ratio of the amount of starting material (A) to combined amounts of starting materials (B) and (C) if present is in the range of from 0.3 to 0.8.

9. The process of claim 1, wherein the solventless pressure sensitive adhesive composition has a viscosity of less than 5,000 mPa·s at room temperature.

10. The process of claim 1, wherein the hydrosilylation reaction catalyst comprises platinum.

11. The process of claim 1, wherein starting material (C) is present in an amount of from zero to 6%, by weight based on the total weight of starting materials in the solventless pressure sensitive adhesive composition.

12. The process of claim 1, wherein the polyorganohydrogensiloxane comprises unit formula (IV): $(R^1_3SiO_{1/2})_2$ $(R^1_2SiO_{2/2})_e(HR^1_2SiO_{2/2})_f$, where $R^1$ is as described above, e≥0, f≥3, and (e+f) is from 4 to 500.

13. The process of claim 1, wherein the process is conducted with 80 ppm by weight or less of a solvent, based on total weight of starting materials in the solventless pressure sensitive adhesive composition.

14. A method of making an adhesive article comprising:

preparing a solventless pressure sensitive adhesive composition by a process comprising:

(i) providing starting material (A) a solid polyorganosilicate resin component comprising:

(A-1) more than 30% to 100% by weight, based on the weight of starting material (A), of a solid capped resin of unit formula (1-1):

$$(R^M_3SiO_{1/2})_a(SiO_{4/2})_bZ_c$$

where each $R^M$ is independently a monovalent hydrocarbon group of from 1 to 20 carbon atoms; each Z is independently a hydrolyzable group selected from the group consisting of alkoxy, hydroxyl, or mixtures thereof; c is from 0 to a value sufficient to give the capped resin a hydrolyzable group content up to 2% by weight, based on the weight of the capped resin; and a and b have values such that a>4, b>0, and the value of (a+b) is sufficient to give the capped resin a number average molecular weight of from 500 to 8,000 g/mol; and (A-2) zero to less than 70% by weight, based on the weight of starting material (A), of a solid uncapped resin of unit formula of (1-2):

$$(R^M_3SiO_{1/2})_{a'}(SiO_{4/2})_{b'}Z_{c'}$$

where $R^M$ and Z are as described above; a' and b' have values such that a'>4, b'>0, and the value of (a'+b') is sufficient to give the uncapped resin a number average molecular weight of from 500 to 8,000 g/mol; and c' has a value sufficient to give the uncapped resin a hydrolyzable group content of >2% to 10% by weight, based on the weight of the uncapped resin;

(ii) mixing starting material (A) with starting material (B) and optionally starting material (C) at a temperature of 100° C. or higher;

wherein starting material (B) is an aliphatically unsaturated polydiorganosiloxane (B-1), a branched polyorganosiloxane (B-2), or a mixture of (B-1) and (B-2), wherein the aliphatically unsaturated polydiorganosiloxane (B-1) comprises unit formula (11-1):

$$(R^1_2R^2SiO_{1/2})_x(R^1_3SiO_{1/2})_y(R^1R^2SiO_{2/2})_z(R^1_2SiO_{2/2})_w$$

where each $R^1$ is independently a monovalent hydrocarbon group of from 1 to 20 carbon atoms that is free of aliphatic unsaturation; each $R^2$ is independently a monovalent aliphatically unsaturated hydrocarbon group of from 2 to 20 carbon atoms; x, y, z, and w have values such that x>0, y≥0, (x+y)=2, z≥0, w≥0, (w+z)>0, and the value of (x+y+z+w) is sufficient to give the aliphatically unsaturated polydiorganosiloxane a number average molecular weight of from 5,000 to 50,000 g/mol;

wherein the branched polyorganosiloxane (B-2) comprises unit formula (II-2):

$$(R^1_3SiO_{1/2})_g(R^1_2R^2SiO_{1/2})_h(R^1_2R^2SiO_{2/2})_i(SiO_{4/2})$$

where $R^1$ and $R^2$ are as described above, and g, h, and i have values such that 2≥g≥0, 4≥h ≥0, 995≥i≥4, (g+h)=4, and the value of (g+h+i) is sufficient to give the branched polyorganosiloxane a number average molecular weight of from 5,000 to 50,000 g/mol;

wherein starting material (C) is a polydiorganosiloxane gum of unit formula (III):

$$(R^1_2R^GSiO_{1/2})_2(R^1_2SiO_{2/2})_d$$

where $R^1$ is as described above; each $R^G$ is independently a monovalent aliphatically unsaturated hydrocarbon group of from 2 to 20 carbon atoms, hydroxyl, or combinations thereof; and d has a value sufficient to give the polydiorganosiloxane gum a number average molecular weight of 300,000 g/mol or more;

wherein starting materials (A), (B), and (C) are present in amounts to provide a weight ratio of the amount of starting material (A) to combined amounts of starting materials (B) and (C) if present of from 0.1 to 1.2;

(iii) cooling the mixture obtained from step (ii) to form a silicone base part with a viscosity of less than 5,000 mPa·s at room temperature; and (iv) admixing the silicone base part obtained from step (iii) with starting material (D) a polyorganohydrogensiloxane, starting material (E) a hydrosilylation reaction catalyst, optionally starting material (F) a hydrosilylation reaction inhibitor, and optionally starting material (G) an anchorage additive; thus forming the solventless pressure sensitive adhesive composition, wherein the process is conducted in the substantial absence of a solvent, thereby preparing the solventless pressure sensitive adhesive composition, optionally (1) treating a surface of a substrate, (2) coating the solventless pressure sensitive adhesive composition on the surface of the substrate, and (3) curing the solventless pressure sensitive adhesive composition.

\* \* \* \* \*